US010928657B2

(12) United States Patent
Schein et al.

(10) Patent No.: US 10,928,657 B2
(45) Date of Patent: Feb. 23, 2021

(54) MAGNETIC EYE PROTECTION HOLDER

(71) Applicant: All About Packaging, Inc., Appleton, WI (US)

(72) Inventors: Brogan S. Schein, Neenah, WI (US); Eric S. Hamberger, Menasha, WI (US)

(73) Assignee: All About Packaging, Inc., Appleton, WI (US)

( * ) Notice: Subject to any disclaimer, the term of this patent is extended or adjusted under 35 U.S.C. 154(b) by 212 days.

(21) Appl. No.: 16/260,709

(22) Filed: Jan. 29, 2019

(65) Prior Publication Data
US 2020/0241328 A1 Jul. 30, 2020

(51) Int. Cl.
*A47G 1/17* (2006.01)
*G02C 11/00* (2006.01)
*F16M 13/02* (2006.01)
*A47F 7/02* (2006.01)

(52) U.S. Cl.
CPC .............. *G02C 11/00* (2013.01); *A47F 7/021* (2013.01); *F16M 13/02* (2013.01); *F16M 13/022* (2013.01); *G02C 2200/02* (2013.01); *Y10S 248/902* (2013.01)

(58) Field of Classification Search
CPC ...... A47F 7/021; F16M 11/041; F16M 13/02; F16B 47/00; B60R 7/082; Y10S 248/902; G02C 11/00
USPC ...... 248/206.5, 902; 211/85.1; 351/155, 158
See application file for complete search history.

(56) References Cited

U.S. PATENT DOCUMENTS

| | | | | |
|---|---|---|---|---|
| 3,259,348 A | * | 7/1966 | Dann | B60R 7/082 248/205.3 |
| 5,056,668 A | * | 10/1991 | Berger | A47F 7/021 211/85.1 |
| 5,100,006 A | * | 3/1992 | Forrester | A47F 7/021 211/85.1 |
| 5,316,252 A | * | 5/1994 | Charnow | A47F 5/08 211/85.1 |
| 5,592,244 A | * | 1/1997 | Vyhmeister | A47F 7/021 248/309.1 |
| 7,607,627 B1 | * | 10/2009 | Mchatet | B60R 7/082 24/3.12 |
| 10,582,794 B1 | * | 3/2020 | Ekkert | A47G 29/00 |

* cited by examiner

*Primary Examiner* — Todd M Epps
(74) *Attorney, Agent, or Firm* — Thomas Connelly

(57) ABSTRACT

A magnetic eye protection holder is disclosed which can hold a pair of eye glasses, safety glasses or safety goggles. The holder includes a hollow shell having an exterior surface and an interior surface. The hollow shell has an upper edge, a lower edge, a first end extending from the upper edge to the lower edge, and a second end spaced apart from the first end and located distal from the upper and lower edges. The hollow shell has a first surface inclined relative to the first end, and a second surface spaced apart from and located above the first surface. The magnetic eye protection holder also includes a magnet positioned in the hollow shell and located adjacent to the first end. The magnetic eye protection holder further includes a backing member secured to the first end of the hollow shell which retains the magnet in the hollow shell.

20 Claims, 2 Drawing Sheets

MAGNETIC EYE PROTECTION HOLDER

FIELD OF THE INVENTION

This invention relates to a magnetic eye protection holder which can hold a pair of eye glasses, safety glasses or safety goggles in a conspicuous manner. The magnetic eye protection holder can be removably attached to a vertical, magnetically attractive surface to provide a person with ready access to their glasses when needed.

BACKGROUND OF THE INVENTION

Today, eye protection in the form of eye glasses, safety glasses, safety goggles, etc. are required for many different jobs. The U.S. government's Department of Labor has the Occupational Safety and Health Administration (OSHA) which publishes specific guidelines for when eye protection must be worn in the workplace. Many different industries, especially those dealing with construction, chemical processes, and those which utilize various kinds of machinery, including but not limited to: lathes, grinders, drill presses, punch presses, cutting tools, etc. require that the operator, as well as those persons coming within close proximity of the machinery, to wear eye protection. Such eye protection should be worn when a job or task poses potential hazards due to running machinery, certain chemical processes, environmental conditions, etc. For example, eye protection should be worn when a person needs to perform a job involving mechanical equipment, chemical hazards, radiological hazards, biological hazards, mechanical hazards or electrical hazards. The eye protection can prevent an object, debris or irritants from causing injury or impairment to a person's eyes.

It is also advantageous for home owners, gardeners, yard workers, etc. to wear eye protection when operating power equipment, such as lawn mowers, hedge trimmers, snow blowers, electric drills, circular saws, etc.

Many employers issue safety glasses to their employees but the employees do not have a designated place to store such safety glasses. Hence, the safety glasses end up being stored in various places, such as in a desk drawer, in a tool chest, in a clothes locker, etc. By storing the eye protection in various places, it can make it difficult to find them when needed. If a person cannot find his or her safety glasses, he or she is not likely to wear them. Instead, they may take a chance that they won't be injured.

Now, a magnetic eye protection holder has been invented which can retain a pair of eye glasses, safety glasses or safety goggles in a conspicuous manner. The magnetic eye protection holder can be removably attached to a magnetically attractive surface to provide a person with ready access to their glasses when needed. The magnetic eye protection holder allows the eye protection to be visibly stored in the same location at all times, making them easy to find and use. The magnetic eye protection holder can be attached to a vertical or slightly inclined ferrous, ferroalloy, iron, metal or steel surface. The magnetic eye protection holder offers a way for a person to keep his or her eye protection in the same place and visually prominent when not being worn. The magnetic eye protection holder allows the eye protection to be easily and quickly grasp and removed with either hand. The magnetic eye protection holder can be attached to a vertical, magnetically attractive surface, such as: a desk, a tool chest, a tool box, a locker, a storage locker, a filing cabinet, an interior surface of a metal door, an exterior surface of a metal door, to the exterior surface of a piece of machinery, to a forklift truck, etc. The magnetic eye protection holder can also be attached to a vertical, magnetically attractive I-beam located adjacent to machinery.

In a residential setting, the magnetic eye protection holder could be attached to the front of a refrigerator or freezer or to some other appliance having a magnetically attractive surface.

SUMMARY OF THE INVENTION

Briefly, this invention relates to a magnetic eye protection holder for retaining a pair of eye glasses, safety glasses or safety goggles in a conspicuous manner. The magnetic eye protection holder can be removably attached to a vertical or slightly inclined magnetically attractive surface and provide a person with ready access to their glasses when needed.

The magnetic eye protection holder includes a hollow shell having an exterior surface and an interior surface. The hollow shell has an upper edge, a lower edge, a first end extending from the upper edge to the lower edge, and a second end spaced apart from the first end and located distal from the upper and lower edges. The hollow shell has a first surface inclined relative to the first end, and a second surface spaced apart from and located above the first surface. The magnetic eye protection holder also includes a magnet positioned in the hollow shell and located adjacent to the first end. The magnetic eye protection holder further includes a backing member secured to the first end of the hollow shell which retains the magnet in the hollow shell.

The general object of this invention is to provide a magnetic eye protection holder for retaining eye glasses, safety glasses or safety goggles in a highly visible location until needed. A more specific object of this invention is to provide a magnetic eye protection holder which can be removable attached to various vertical, magnetically attractive surfaces such that the eye protection is readily accessible to the user of the eye protection, and the eye protection can be quickly and easily removed from the magnetic eye protection holder.

Another object of this invention is to provide a magnetic eye protection holder which is easy to manufacture, relatively inexpensive to produce, and easy to use.

A further object of this invention is to provide a magnetic eye protection holder which will prevent the eye protector from being scratched, damaged or crushed while being retained in a desired location.

Still another object of this invention is to provide a magnetic eye protection holder which can be attached and removed easily without the need for any tools.

Still further, an object of this invention is to provide a magnetic eye protection holder which can be attached to a highly visible magnetically attractive surface, and which can retain various sizes of eye glasses, safety glasses or safety goggles in a desired location for ready access by a potential user, and which thereby promotes safety in all scenarios.

Other objects and advantages of the present invention will become more apparent to those skilled in the art in view of the following description and the accompanying drawings.

DETAILED DESCRIPTION OF THE INVENTION

Referring to FIGS. 1-7, a magnetic eye protection holder 10 is shown. The magnetic eye protection holder 10 can hold a pair of eye glasses, safety glasses or safety goggles in a conspicuous manner. By "eye glasses" it is meant a pair of lenses mounted in a light frame, used to correct faulty vision or to protect the eyes. By "safety glasses and safety goggles" it is meant a pair of lenses constructed from a shatter proof material. The magnetic eye protection holder 10 can be removably attached to a vertical, magnetically attractive surface to provide a person with ready access when their safety glasses are needed.

Figure 2:
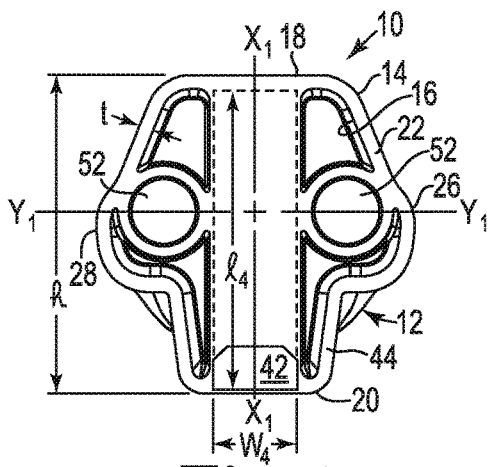
FIG. 2 is an end view of the magnetic eye protection holder shown in FIG. 1 partially cut away to reveal a magnet.

The magnetic eye protection holder 10 includes a hollow shell 12 having an exterior surface 14 and an interior surface 16, see FIG. 2. By "hollow shell" it is meant something resembling or having the form of a shell, especially an external usually hard protective or enclosing case or cover. The hollow shell 12 can be formed or molded from a variety of materials. Desirably, the hollow shell 12 is thermoformed or injection molded from a plastic or from a thermoplastic material. Other forming methods known to those skilled in the art can also be used to construct the hollow shell 12. The hollow shell 12 can be formed from virgin plastic or recycled plastic. The hollow shell 12 could be constructed from a clear and/or transparent material or from an opaque material. By "opaque" it is meant impenetrable by light, neither transparent nor translucent. Desirably, the hollow shell 12 is formed from an opaque material. The hollow shell 12 can be manufactured in any color known to those skilled in the art or be manufactured in white. Alternatively, the hollow shell 12 can be manufactured in two or more colors or have some design or pattern printed or formed thereon. Another option is to cover at least a portion of the hollow shell 12 with a label or decal.

As mentioned above, the hollow shell 12 can be formed from a variety of materials. The hollow shell 12 can be formed from polyethylene terephthalate (PET). PET is the chemical name for polyester. PET is a clear, strong, and lightweight plastic. The basic building blocks of PET are ethylene glycol and terephthalic acid, which are combined to form a polymer chain. The resulting spaghetti-like strands of PET are extruded, quickly cooled, and cut into small pellets. The resin pellets are then heated to a molten liquid that can be easily extruded or molded into items of practically any shape.

PET was first synthesized in North America in the mid-1940s by DuPont chemists searching for new synthetic fibers. DuPont later branded its PET fiber as "Dacron".

Today, more than half of the world's synthetic fiber is made from PET, which is called "polyester" when used for fiber or fabric applications. When used for containers and other purposes, it is called PET or PET resin.

It should be understood that other thermoplastic materials, known to those skilled in the art, can also be used to construct the hollow shell 12. These other materials include, but are not limited to: polyolefins, including polyethylene, polypropylene or variations thereof. Polyethylene is a polymerized ethylene resin, used especially for containers, kitchenware, and tubing or in the form of films and sheets for packaging. Polypropylene is any of various thermoplastic resins that are polymers of polypropylene and are used to make molded articles and fibers.

Other thermoplastic materials that can also be used include polyethylene terephthalate with glycol (PETG), polypolyvinyl (PV) and polyvinyl chloride (PVC). Polyethylene terephthalate with glycol (PETG) is of the same chemical composition as PET but with the addition of glycol. With just this one addition, the chemical composition is completely changed, creating a whole new plastic. The addition of glycol to create PETG removes the hazing effect seen during heating and also prevents an undesirable crystallization effect that causes standard PET to become brittle. Additionally, the inclusion of glycol in this plastic will transform the outer walls of a bottle into a softer and more pliable material, making it easier and more comfortable to grip.

Polypolyvinyl (PV) designates any of a group of polymerized thermoplastic vinyls, as polyvinyl choride. Polyvinyl chloride (PVC) is a solid plastic made from vinyl chloride. It is made softer and more flexible by the addition of phthalates, and can contain traces of bisphenol A (BPA).

Recyclable thermoplastic materials can also be used. Such recyclable thermoplastics include, but are not limited to: recyclable PET, recyclable PETG, recyclable polypolyvinyl (PV), recyclable PVC, as well as other recyclable plastics known to those skilled in the art.

Referring again to FIGS. 1-7, the exterior surface 14 of the hollow shell 12 can be made smooth. By "smooth" it is meant having a surface free from irregularities, roughness or projections. The exterior surface 14 is relatively hard. The exterior surface 14 can also be made to be flexible, if desired. The exterior surface 14 could be made to be hard yet soft to the touch. The exterior surface 14 can be glossy or be dull in appearance, not bright or vivid.

The magnetic eye protection holder 10 can be washed and/or cleaned thereby allowing it to be utilized in a dusty, dirty and/or in an oily environment. The exterior surface 14 of the hollow shell 12 should have a 3-dimensional configuration which will make washing and/or cleaning easy. In other words, no tight corners or small pockets should be present which could trap and/or hold dirt.

Figure 1:
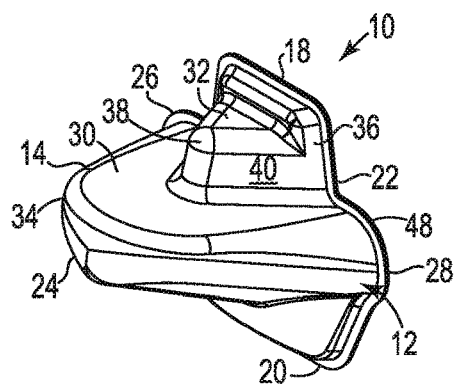
FIG. 1 is a perspective view of a magnetic eye protection holder.

Referring now to FIGS. 1 and 2, the hollow shell 12 has an upper edge 18 and a lower edge 20. Desirably, the upper and lower edges, 18 and 20 respectively, are aligned parallel to one another. The upper and lower edges, 18 and 20 respectively, are shown as being linear. By "linear" it is meant of or relating to, or resembling a line, straight; having only one dimension. Alternatively, the upper and lower edges, 18 and 20 respectively, could be designed to have a non-linear appearance, such as being curved, rounded or having some other geometrical profile.

Figure 3:
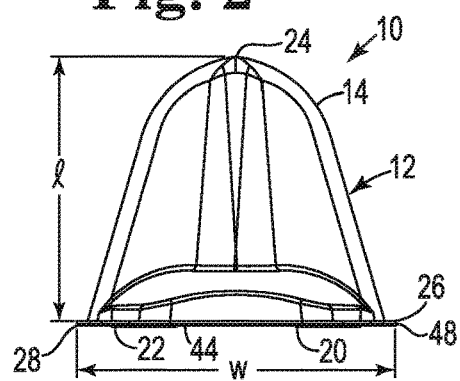
FIG. 3 is a bottom view of the magnetic eye protection holder shown in FIG. 1.

Referring now to FIGS. 1-3, the hollow shell 12 also has a first end 22 and a second end 24. The first end 22 extends from the upper edge 18 to the lower edge 20. The second end 24 is spaced apart from the first end 22 and is located distal from the upper and lower edges, 18 and 20 respectively, see FIG. 3. The first end 22 is flat or planar. The second end 24 is rounded or curved. Alternatively, the second end 24 could be pointed, if desired. The hollow shell 12 further has a first side 26 and a second side 28.

Referring to FIGS. 2 and 3, the hollow shell 12 is an integral member. By "integral member" it is meant a complete unit, a whole. The hollow shell 12 has a 3-dimensional configuration. The hollow shell 12 has a height h, a width w, and a length l. The height h is measured between the upper and lower edges, 18 and 20 respectively. The width w is measured between the first and second sides, 26 and 28 respectively. The length l is measured between the first end 22 and the second end 24, The height h, width w, and the length l can all vary in dimension. For a standard size magnetic eye protection holder 10, the height h can range from between about 3 inches to about 5 inches. Desirably, the height h will range from between about 3 inches to about 4.5 inches. More desirably, the height h will range from between about 3 inches to about 4 inches. Even more desirably, the height h will range from between about 3.25 inches to about 3.75 inches. Most desirably, the height h will be about 3.5 inches.

For a standard size magnetic eye protection holder 10, the width w can range from between about 3 inches to about 5 inches. Desirably, the width w will range from between about 3 inches to about 4.5 inches. More desirably, the width w will range from between about 3 inches to about 4 inches. Even more desirably, the width w will range from between about 3.25 inches to about 3.75 inches. Most desirably, the width w will be about 3.5 inches.

For a standard size magnetic eye protection holder 10, the length l can range from between about 2.5 inches to about 4.5 inches. Desirably, the length l will range from between about 2.75 inches to about 4.25 inches. More desirably, the length l will range from between about 3 inches to about 4 inches. Even more desirably, the length l will range from between about 3 inches to about 3.5 inches. Most desirably, the length l will be about 3.2 inches.

The hollow shell 12 also has a thickness t. The thickness t can vary in dimension. The thickness t of the hollow shell 12 can be uniform over its 3-dimensional configuration or be non-uniform, if desired. Desirably, the hollow shell 12 will have a uniform thickness t. The thickness t of the hollow shell 12 can range from between about 0.5 millimeters to about 1.5 millimeters. A millimeter is a unit of length equal to one thousandth ($10^{-3}$) of a meter, or 0.0394 inches. Desirably, the thickness t of the hollow shell 12 will range from between about 0.5 millimeters to about 1.25 millimeters. More desirably, the thickness t of the hollow shell 12 will range from between about 0.5 millimeters to about 1 millimeter. Most desirably, the thickness t of the hollow shell 12 will be less than about 1.5 millimeters.

Referring again to FIGS. 1 and 4-6, the hollow shell 12 also has a first surface 30 and a second surface 32. The first surface 30 is inclined relative to a horizontal line passing through the first end 22. By "incline" it is meant to deviate from a plane; slant. The angle of inclination is shown in FIG. 5 as alpha ($\alpha$). The angle $\alpha$ can vary in degrees. The angle $\alpha$ can range from between about 1 degree to about 30 degrees. Desirably, the angle $\alpha$ can range from between about 10 degree to about 30 degrees, More desirably, the angle $\alpha$ can range from between about 15 degree to about 30 degrees. Even more desirably, the angle $\alpha$ can range from between about 20 degree to about 30 degrees.

Still referring to FIGS. 1 and 4-6, the first surface 30 of the hollow shell 12 is flat or planar. By "planar" it is meant of, relating to, or situated in a plane; having a two-dimensional quality.

Figure 6:
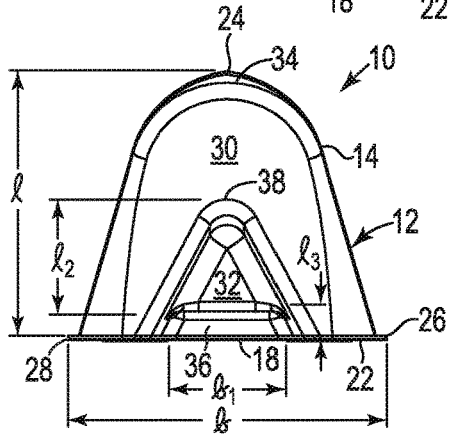
FIG. 6 is a top view of the magnetic eye protection holder shown in FIG. 1.
Figure 7:
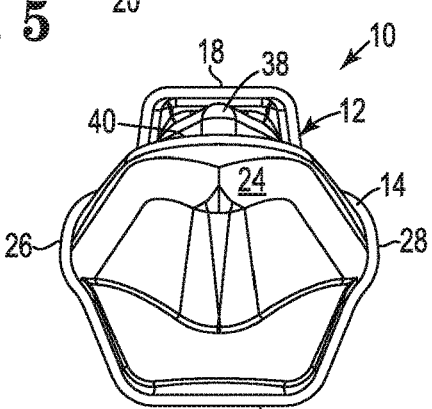
FIG. 7 is a front view of the magnetic eye protection holder shown in FIG. 1.

Referring now to FIGS. 1 and 6, the first surface 30 has an essentially triangular configuration when viewed from above. The triangular configuration of the first surface 30 has a base b, a length $l_1$ and an apex 34. The base b of the first surface 30 is aligned parallel to and is located adjacent to the first end 22. The base b of the first surface 30 can vary in dimension. The base b of the first surface 30 can range from between about 2.5 inches to about 3.5 inches. Desirably, the base b of the first surface 30 is less than 3 inches. The length $l_1$ of the first surface 30 is measured perpendicularly to the base b. The length $l_1$ of the first surface 30 is aligned parallel to the length l of the hollow shell 12. The length $l_1$ of the first surface 30 can vary in dimension. The length $l_1$ of the first surface 30 can range from between about 2.5 inches to about 3.5 inches. Desirably, the length $l_1$ of the first surface 30 is less than 3 inches. The apex 34 of the first surface 30 is conterminous with the second end 24. By "conterminous" it is meant sharing a boundary; contiguous. Desirably, the apex 34 of the first surface 30 is essentially conterminous with the second end 24. The apex 34 is shown having a slight radius at the point where it intersects the second end 24.

Figure 4:
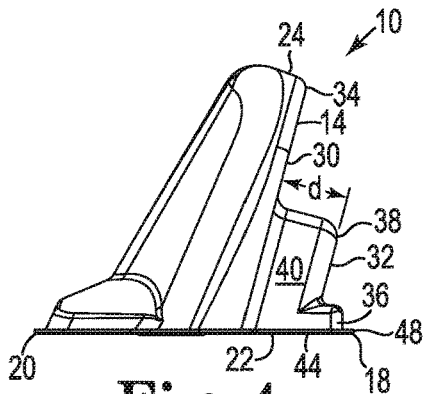
FIG. 4 is a left side view of the magnetic eye protection holder shown in FIG. 3.
Figure 5:
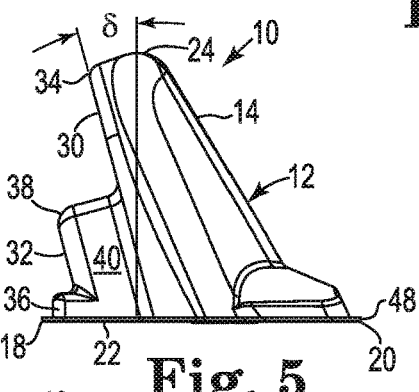
FIG. 5 is a right side view of the magnetic eye protection holder shown in FIG. 3.

Still referring to FIGS. 1, 4 and 6, the second surface 32 is spaced apart from and located above the first surface 30. The second surface 32 is located at a distance d above the first surface 30, see FIG. 4. The distance d can vary in dimension. The distance d that the second surface 32 is spaced above the first surface 30 can range from between about 0.25 inches to about 0.75 inches. Desirably, the distance d that the second surface 32 is spaced above the first surface 30 can range from between about 0.25 inches to about 0.7 inches. More desirably, the distance d that the second surface 32 is spaced above the first surface 30 can range from between about 0.25 inches to about 0.65 inches. Even more desirably, the distance d that the second surface 32 is spaced above the first surface 30 can range from between about 0.3 inches to about 0.6 inches. Most desirably, the distance d that the second surface 32 is spaced above the first surface 30 is about 0.5 inches.

The second surface 32 also has an essentially triangular configuration when viewed from above. The triangular configuration of the second surface 32 is smaller than the triangular configuration of the first surface 30. In other words, the first surface 30 is larger than the second surface 32. The triangular configuration of the second surface 32 has a base $b_1$, a length $l_2$ and an apex 38. The base $b_1$ of the second surface 32 is aligned parallel to the first end 24. The base $b_1$ of the second surface 32 can vary in dimension. The base $b_1$ of the second surface 32 can range from between about 0.75 inches to about 1.25 inches. Desirably, the base $b_1$ of the second surface 32 is about 1 inch.

Referring now to FIGS. 4-6, a protrusion 36 is shown which separated the base $b_1$ of the second surface 32 from the first end 22. The protrusion 36 extends inward away from the first end 22 and towards the second end 24. The protrusion 36 has a length $l_3$, see FIG. 6, which can vary in dimension. The length $l_3$ of the protrusion 36 can range from between about 0.1 inches to about 0.5 inches. Desirably, the length $l_3$ of the protrusion 36 can range from between about 0.1 inches to about 0.4 inches. More desirably, length $l_3$ of the protrusion 36 can range from between about 0.15 inches to about 0.3 inches. Most desirably, length $l_3$ of the protrusion 36 will be about 0.25 inches.

It should be understood that the protrusion 36 is optional and could be eliminated, if desired.

The protrusion 36 causes the base $b_1$ of the second surface 32 to be located away from the first end 22 by a distance which is greater than the distance the base b of the first end 22 is spaced apart from the first end 22.

The length $l_2$ of the second surface 32 is measured perpendicularly to the base b. The length $l_2$ of the second surface 32 is aligned parallel to the length l of the hollow shell 12. The length $l_2$ of the second surface 32 can vary in dimension. The length $l_2$ of the second surface 32 can range from between about 0.5 inches to about 1 inch. Desirably, the length $l_2$ of the second surface 32 is about 0.75 inches. The length $l_2$ of the second surface 32 is less than half the length $l_1$ of the first surface 30.

Referring now to FIGS. 1, 4 and 5, the apex 38 of the second surface 32 is spaced between the first and second ends, 22 and 24 respectively. The apex 38 of the second surface 32 is also spaced between the first and second sides, 26 and 28 respectively, of the hollow shell 12. Desirably, the apex 38 of the second surface 32 is situated at the midpoint between the first and second sides, 26 and 28 respectively. The apex 38 of the second surface 32 is shown having a slight radius at the point where it intersects a vertical wall 40. The vertical wall 40 joins the first surface 30 to the second surface 32. The size, shape and configuration of the second surface 32, in cooperation with the vertical wall 40, enables the triangular nose portion of the frame of a pair of eye glasses, safety glasses or safety goggles to easily mate with the triangular configuration of the second surface 32. When the pair of eye glasses, safety glasses or safety goggles is so positioned about the triangular configuration of the second surface 32, the horizontal portion of the frame of a pair of eye glasses, safety glasses or safety goggles will rest on the first surface 30. The dimension of the base b of the triangularly configured first surface 30 is sufficiently wide to support the weight of the pair of glasses, safety glasses or safety goggles and also hold the pair of glasses, safety glasses or safety goggles stationary.

Referring again to FIG. 2, the magnetic eye protection holder 10 also includes a magnet 42. By "magnet" it is meant an object that is surrounded by a magnetic field and has the property, either natural or induced, of attracting iron or steel. The magnet 42 is positioned in the hollow shell 12 and is located adjacent to the first end 26. The magnet 42 is held secure and stationary by a backing member 44. The backing member 44 is secured to the first end 22 of the hollow shell 12 which retains the magnet 42 in the hollow shell 12.

In FIG. 2, a single magnet 42 is depicted. The magnet 42 can be a flexible magnet or a non-flexible magnet. The magnet 42 can have any desired geometrical configuration but for explanation purposes only, it will be described as an elongated strip of magnetic material having a longitudinal central axis $X_1$-$X_1$, a transverse central axis $Y_1$-$Y_1$, and a vertical central axis $Z_1$-$Z_1$ (not shown). The vertical central axis $Z_1$-$Z_1$ is aligned perpendicular to both the longitudinal central axis $X_1$-$X_1$ and the transverse central axis $Y_1$-$Y_1$. The magnet 42 has a length $l_4$ measured parallel to the longitudinal central axis $X_1$-$X_1$. The length $l_4$ of the magnet 42 can vary in dimension. When the magnet 42 is a single elongated strip, it should have a length $l_4$ of at least about 1.5 inch, desirably, at least about 2 inches, and more desirably, at least about 2.5 inches. The length $l_4$ of the magnet 42 can vary depending upon the overall size of the magnetic eye protection holder 10. Normally, the length $l_4$ of the magnet 42 will increase as the overall size of the magnetic eye protection holder 10 increases. The length $l_4$ of the magnet 42 extends between the upper edge 18 and the lower edge 20 of the hollow shell 12.

The magnet 42 also has a width $w_4$ which can also vary in dimension. The width $w_4$ of the magnet 42 can range from between about 0.5 inches to about 1.5 inches. Desirably, the width $w_4$ of the magnet 42 ranges from between about 0.7 inches to about 1.2 inches. More desirably, the width $w_4$ of the magnet 42 is about 1 inch.

Furthermore, the magnet 42 has a thickness (not shown) which can vary in dimension, as well. The thickness of the magnet 42 can range from between about 0.01 inches to about 0.5 inches. Desirably, the thickness of the magnet 42 can range from between about 0.05 inches to about 0.3 inches. More desirably, the thickness of the magnet 42 can range from between about 0.1 inches to about 0.25 inches.

The magnet 42 can be purchased from a variety of commercial vendors. One such company that sells magnets is Bunting Magnetic Company of Newton, Kans. The magnet 42 can be formed from any suitable magnet material, including ceramic, metallic and flexible magnetic materials. The magnet 42 can be a discrete ceramic or ferrite elements in a discoidal or substantially rectangular shape. Alternatively, the magnet 42 can be cut from a magnetic sheet into a smaller shape and size. Multiple smaller magnet members can be cut to form a series of discrete magnets 42.

The magnet 42 can also be formed from a homogeneous material which is magnetized with one pole along one surface and an opposite pole along an opposite surface to form north-south regions. Likewise, the magnet 42 can be formed from a conventional flexible magnet of the sort having magnetizable barium ferrite particles dispersed in a rubbery matrix. Such materials are available from Arnold Engineering Company and RJF International Corporation. The magnet 42 can further be formed from a suitable powdered metallic material such as iron oxide.

Still referring to FIG. 2, the magnet 42 can be held in place within the hollow shell 12 in any suitable manner. For example, the magnet 42 can be secured between a portion of the interior surface 14 of the hollow shell 12 and the backing member 44. Alternatively, the magnet 42 can be secured to either the hollow shell 12 or to the backing member 44, or to both using glue, an adhesive, by an epoxy, by a silicone adhesive, by a cyanoacrylate adhesive, or by some other adhesive known to those skilled in the adhesive art. Alternatively, the magnet 42 could be inserted into a recess formed within the hollow shell 12 (not shown) and be held in place by a tight, friction or interference fit. Still further, the magnet 42 could be secured either to the hollow shell 12 or to the backing member 44 by a mechanical device or be secured using a tongue and groove structure.

Figure 8:
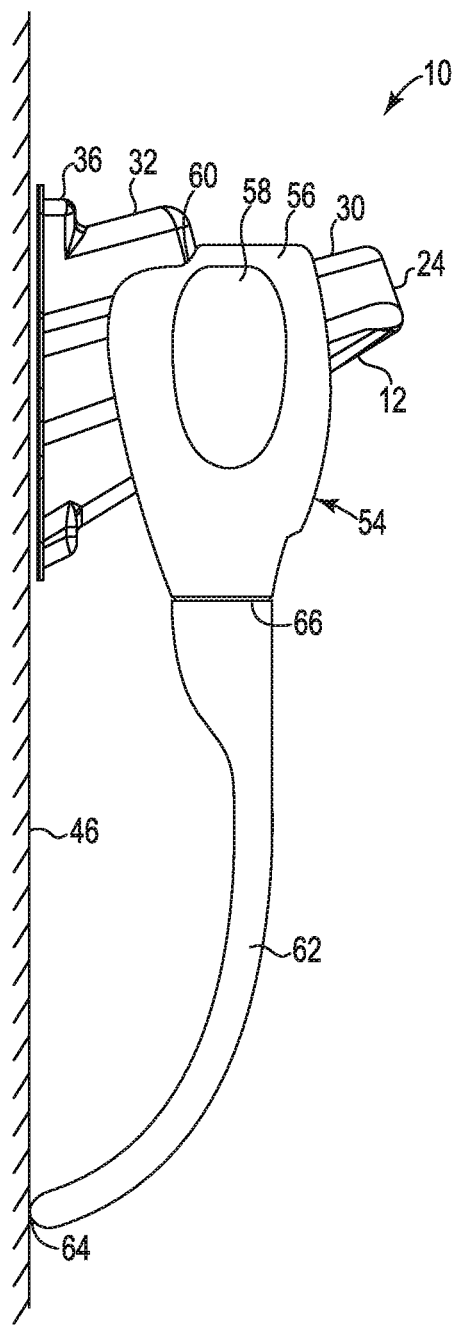
FIG. 8 is a side view of the magnetic eye protection holder mounted on a is vertical, metal member and depicting a pair of safety glasses positioned on the holder.

Referring now to FIG. 8, the magnet 42 can produce a magnetic flux. The magnetic flux will attract and secure the first end 22 of the hollow shell 12 to a magnetically attractive surface 46. The magnetic flux should be of a sufficient force that the magnetic eye protection holder 10 will resist movement relative to the magnetically attractive surface 46.

The magnet 42 exerts a sufficient magnetic attraction through the backing member 44 to releasably attach the magnetic eye protection holder 10 to a magnetically attractive surface 46. The magnetically attractive surface 46 can be almost any kind of metal surface. By "metal" it is meant any of a category of electropositive elements that usually have a shiny surface, are generally good conductors of heat and electricity, and can be melted or fused, hammered into thin sheets, or drawn into wires. The magnetically attractive surface 46 can also be ferrous, a ferroalloy, iron or steel. By "ferrous" it is meant of or relating to, or containing iron, especially with valence 2 or a valence lower than in a corresponding ferric compound. By "ferroalloy" it is meant any of various alloys of iron and one or more other elements. By "iron" it is meant a lustrous, malleable, ductile, magnetic or magnetizable metallic element occurring abundantly in ores such as hematite and magnetite and used alloyed in a wide range of important structural materials. By "steel" it is meant a generally hard, strong, durable malleable alloy of iron and carbon, usually containing between 0.2 and 1.5 percent carbon, often with other constituents such as manganese, chromium, nickel, or silicon, depending on the desired alloy properties, and widely used as a structural material.

For example, the magnetically attractive surface 46 can be a vertical surface or a surface inclined at some angle to a vertical axis. The magnetically attractive surface 46 can be a metal: desk, tool chest, tool box, locker, storage locker, filing cabinet, I-beam, refrigerator, freezer, the interior surface of a metal door, the exterior surface of a metal door, metal wall, a piece of machinery, a movable vehicle, such as a forklift truck, a truck, a wagon, a tractor, etc. The magnetic eye protection holder 10 can also be attached to a vertical, magnetically attractive surface of almost any article, device or structure known to those skilled in the art.

Returning to FIGS. 1-6, the backing member 44 has an inner surface 48 and an outer surface 50. The backing member 44 can have a 2-dimensional configuration or a 3-dimentional configuration. Desirably, the backing member 44 has a 3-dimensional configuration. The backing member 44 can be formed from a variety of materials. For example, the backing member 44 can be formed from a plastic, a thermoplastic, cardboard, paper, etc, Desirably, the backing member 44 is formed from a thermoplastic material. Any of the plastic or thermoplastic materials mentioned above, which can be used to form the hollow shell 12, can also be used to form the backing member 44. The backing member 44 has is relatively thin. The backing member 44 has a thickness which is less than the thickness t of the hollow shell 12. The thickness of the backing member 44 can range from between about 15 mils to about 75 mils. By "mil" it is meant a unit of length equal to one thousandth ($10^{-3}$) of an inch (0.0254 millimeter). Desirably, the backing member 44 has a thickness ranging from between about 15 mils to about 70 mils. More desirably, the backing member 44 has a thickness ranging from between about 15 mils to about 60 mils. Even more desirably, the backing member 44 has a thickness ranging from between about 15 mils to about 50 mils. Most desirably, the backing member 44 has a thickness of less than about 50 mils.

When the backing member 44 is formed from a plastic or thermoplastic material, it can be secured to the first end 22 of the hollow shell 12 in a number of different ways known to those skilled in the art. For example, the backing member 44 can be heat sealed to the first end 22 of the hollow shell 12. Alternatively, the backing member 44 can be secured to the hollow shell 12 pressure, heat and pressure, using glue, an adhesive, an epoxy, a silicone adhesive, a cyanoacrylate adhesive, or by some other adhesive known to those skilled in the adhesive art. In addition, the backing member 44 can be mechanically secured to the hollow shell 12.

When a 3-dimensional backing member 44 is utilized, the backing member 44 can be configured to have a recess which is sized to receive and hold the magnet 42 stationary. In addition, the 3-dimensional backing member 44 can posses a certain geometrical contour which can at least partially be fitted into the hollow shell 12 such that it contacts a portion of the interior surface 16 of the hollow shell 12 and forms a tight or interference fit therewith. This 3-dimensional structure can be in addition to the portion of the backing member 44 which is secured to the first end 22 of the hollow shell 12. Furthermore, the 3-dimensional configuration can partially enclose the magnet 42 and cooperate with a portion of the interior surface 16 of the hollow shell 12 to hold the magnet 42 stationary therebetween.

Still referring to FIG. 2, the magnetic eye protection holder 10 can optionally include one or more anti-skid pads 52. A pair of anti-skid pads 52, 52 is shown in FIG. 2. Each anti-skid pad 52 can have any desired geometrical shape and is thickness. Each anti-skid pad 52 can be formed from a variety of materials possessing a relatively high coefficient of friction. By "coefficient of friction" it is meant a numerical measure of a physical or chemical property of a surface that is constant for a system under specified conditions. Coefficient of friction is a value that shows the relationship between the force of friction between two objects and the normal reaction between the objects that are involved. It is a value that is sometimes used in physics to find an object's normal force or frictional force when other methods are unavailable. The coefficient of friction is shown by $F_f=\mu F_n$. $F_f$ is the frictional force, $\mu$ is the coefficient of friction, and $F_n$ is the normal force. The coefficient of friction can be two different things. It is either the coefficient of static friction $\mu_s$ or the coefficient of kinetic friction $\mu_k$. The coefficient of static friction is the friction force between two objects when neither of the objects is moving. The coefficient of kinetic friction is the force between two objects when one object is moving, or if two objects are moving against one another. The coefficient of friction is dimensionless and it does not have any units. It is a scalar, meaning the direction of the force does not affect the physical quantity.

The coefficient of friction depends on the objects that are causing friction. The value is usually between 0 and 1 but can be greater than 1. A value of 0 means there is no friction at all between the objects. This is only theoretically possible. All objects in the real world will have some friction when they touch each other. A value of 1 means the frictional force is equal to the normal force. Some people think that the coefficient of friction can never be more than 1, but this is not true. A coefficient of friction that is more than 1 just means that friction is stronger than the normal force. An object such as silicone rubber, for example, can have a coefficient of friction much greater than 1.

Each anti-skid pad 52 can be formed from almost any material which has a relatively high coefficient of friction value. A softer material works well for it will not mar or scratch the surface it comes in contact with. Rubber and rubberized foam are two such materials from which the anti-skid pads 52, 52 can be constructed. However, those skilled in the art are well aware of many materials that posses a relatively high coefficient of friction value and which can be used to form the anti-skid pads 52, 52. Each anti-skid pad 52 should have a coefficient of friction of greater than about 0.3. Desirably, each anti-skid pad 52 will have a coefficient of friction of greater than about 0.35. More desirably, each anti-skid pad 52 will have a coefficient of friction of greater than about 0.4. Even more desirably, each anti-skid pad 52 will have a coefficient of friction of greater than about 0.45. Most desirably, each anti-skid pad 52 will have a coefficient of friction of greater than 0.5.

Each anti-skid pad 52 can be secured to the outer surface 50 of the backing member 44. In FIG. 2, the pair of anti-skid pads 52, 52 is shown being located on an opposite side of the magnet 42. The pair of anti-skid pads 52, 52 provides extra friction to aid in retaining the magnetic eye protection holder 10 in a desired position on a vertical, magnetically attractive surface 46. The pair of anti-skid pads 52, 52 co-operate with the force of the magnet 42 to hold the magnetic eye protection holder 10 in the desired location.

Referring again to FIG. 8, a magnetically attractive surface 46 is shown on which the magnetic eye protection holder 10 can be removably attached. A pair of eye glasses, safety glasses or safety goggles 54 is shown resting on the magnetic eye protection holder 10. The pair of eye glasses, safety glasses or safety goggles 54 includes a frame 56 having a pair of lenses 58, one of which is depicted, and a triangular nose portion 60. The triangular nose portion 60 is situated between the pair of lenses 58, 58. The pair of eye glasses, safety glasses or safety goggles 54 also includes a pair of side members or bows 62, 62, one of which is depicted. Each of the pair of bows 62, 62 has a terminal end 64. Each of the pair of bows 62, 62 is designed to pass over and/or around a person's ear and hold the pair of eye glasses, safety glasses or safety goggles in place. Each of the pair of bows 62, 62 is attached to the major portion of the frame 56 by a hinge 66, one hinge being shown. Each of the pair of bows 62, 62 is shown in its extended position. The extended position is the same orientation as when the pair of eye glasses, safety glasses or safety goggles 54 is being worn by a person.

As depicted in FIG. 8, the triangular nose portion 60 can easily mate with the triangular configuration of the second surface 32 and the vertical wall 40, When the pair of eye glasses, safety glasses or safety goggles 54 is so positioned about the triangular configuration of the second surface 32 and the vertical wall 40, the horizontal portion of the frame 56 will rest on the first surface 30. The dimension of the base b of the triangularly configured first surface 30 is sufficiently wide to support the weight of the pair of glasses, safety glasses or safety goggles 54 and is capable of holding the pair of glasses, safety glasses or safety goggles stationary. The angle α is such that when the frame 56 is resting on the first surface 30, the terminal ends 64, 64 of the pair of bows 62, 62 will contact the vertical magnetically attractive surface 46. This position assures that the pair of eye glasses, safety glasses or safety goggles 54 will be fully supported by the magnetic eye protection holder 10. The pair of eye glasses, safety glasses or safety goggles 54 will not fall off of the first surface 30 should small vibrations occur in the work place. It also means that the pair of glasses, safety glasses or safety goggles 54 will be readily accessible and will be easy to grab when needed. When the pair of eye glasses, safety glasses or safety goggles 54 is so held, they will be visible, conspicuous and readily available to the owner when needed. In addition, the magnetic eye protection holder 10 will remain in one place, unless intentionally moved to a new location. This means that the owner of the pair of eye glasses, safety glasses or safety goggles 54 will only have to look for his or her glasses in one place. A further advantage of using the magnetic eye protection holder 10 is that it does not require the owner of the pair of eye glasses, safety glasses or safety goggles 54 to fold the pair of bows 62, 62 to a closed position, as is normally done when the glasses 54 are placed in a drawer or in an eye glass case.

It should be understood that the magnetic eye protection holder 10 does not require any clips, clasps or any other kind of mechanical device to hold the pair of eye glasses, safety glasses or safety goggles 54 on the first surface 30. In addition, the pair of eye glasses, safety glasses or safety goggles 54 can be removed from the magnetic eye protection holder 10 with either hand.

Figure 9:
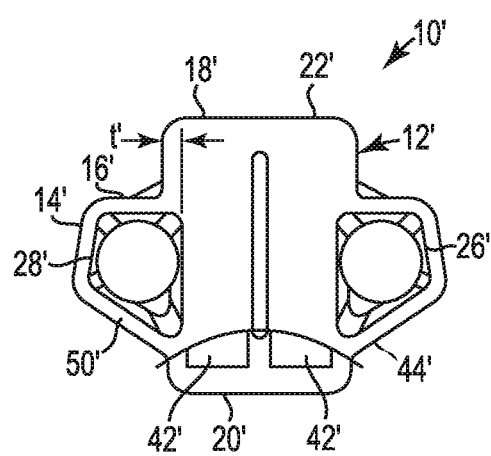
FIG. 9 is an end view of another embodiment of a magnetic eye protection holder which is partially cut away to reveal a pair of magnets.

Referring now to FIG. 9, a magnetic eye protection holder 10' is shown which is similar to the magnetic eye protection holder 10, shown in FIGS. 1-7. The structural features of the magnetic eye protection holder 10', which are identical to those depicted in the magnetic eye protection holder 10, are designated with like numerals bearing the prime (') sign. The magnetic eye protection holder 10' is similar to the magnetic eye protection holder 10 except that it includes two magnets 42', 42'. The two magnets 42', 42' are arranged side by side and are spaced a small distance apart from one another. Each of the two magnets 42', 42' has a rectangular configuration. However, as noted above, each of the two magnets 42', 42' could have any desired geometrical shape.

It should be understood that two or more magnets 42', 42' could be utilized, if desired. The two or more magnets 42', 42' could be arranged in any desired manner, formation or pattern.

While the invention has been described in conjunction with several specific embodiments, it is to be understood that many alternatives, modifications and variations will be apparent to those skilled in the art in light of the foregoing description. Accordingly, this invention is intended to embrace all such alternatives, modifications and variations which fall within the spirit and scope of the appended claims.

We claim:

1. A magnetic eye protection holder comprising:
   a) a hollow shell having an exterior surface and an interior surface, said hollow shell having an upper edge, a lower edge, a first end extending from said upper edge to said lower edge, and a second end spaced apart from said first end and located distal from said upper and lower edges, said hollow shell having a first surface inclined relative to said first end, and a second surface spaced apart from and located above said first surface;
   b) a magnet positioned in said hollow shell and located adjacent to said first end; and
   c) a backing member secured to said first end of said hollow shell which retains said magnet in said hollow shell.

2. The magnetic eye protection holder of claim 1 wherein said backing member has an inner surface and an outer surface, and further comprising a pair of anti-skid pads secured to said outer surface.

3. The magnetic eye protection holder of claim 2 wherein each of said pair of anti-skid pads is located on an opposite side of said magnet.

4. The magnetic eye protection holder of claim 1 wherein said first surface is inclined at an angle of from between 1 degree to 30 degrees relative to said first end.

5. The magnetic eye protection holder of claim 1 wherein said hollow shell is an integral member.

6. The magnetic eye protection holder of claim 1 wherein said upper and lower edges are aligned parallel to one another and said first surface of said hollow shell is planar.

7. The magnetic eye protection holder of claim 1 wherein said hollow shell is formed from a thermoplastic material having a thickness of less than 1.5 millimeters.

8. The magnetic eye protection holder of claim 1 wherein said first surface has a triangular configuration when viewed from above and said triangular configuration has an apex which is conterminous with said second end of said hollow shell.

9. The magnetic eye protection holder of claim 1 wherein said second surface has a triangular configuration when viewed from above, and said triangular configuration has an apex which is spaced between said first and second ends of said hollow shell, and said first surface is larger than said second surface.

10. A magnetic eye protection holder comprising:
a) a hollow shell having an exterior surface and an interior surface, said hollow shell having upper edge, a lower edge, a first end extending from said upper edge to said lower edge, and a second end spaced apart from said first end and located distal from said upper and lower edges, said hollow shell having a first surface inclined relative to said first end, and a second surface spaced apart from and located above said first surface, and said first and second surfaces are aligned parallel to one another;
b) a magnet positioned in said hollow shell and located adjacent to said first end, and said magnet having a rectangular configuration; and
c) a backing member secured to said first end of said hollow shell which retains said magnet in said hollow shell.

11. The magnetic eye protection holder of claim 10 wherein said hollow shell is formed from a thermoplastic material which is thermoformed.

12. The magnetic eye protection holder of claim 10 wherein said hollow shell is formed from a thermoplastic material which is injection molded.

13. The magnetic eye protection holder of claim 10 wherein said hollow shell has a thickness and said backing member has a thickness, and said thickness of said backing member is less than said thickness of said hollow shell.

14. The magnetic eye protection holder of claim 10 wherein said backing member is heat sealed to said hollow shell, and said second surface of said hollow shell is located about 0.5 inches above said first surface of said hollow shell.

15. The magnetic eye protection holder of claim 10 wherein said backing member has an inner surface and an outer surface, and further comprising a pair of anti-skid pads secured to said outer surface, and each of said pair of anti-skid pads has a coefficient of friction of greater than 0.3.

16. A magnetic eye protection holder comprising:
a) a hollow shell having an exterior surface and an interior surface, said hollow shell having upper edge, a lower edge, a first end extending from said upper edge to said lower edge, and a second end spaced apart from said first end and located distal from said upper and lower edges, said hollow shell having a first surface inclined relative to said first end, and a second surface spaced apart from and located above said first surface, said first and said second surfaces each having a triangular configuration when viewed from above, and said first surface being larger than said second surface;
b) a magnet positioned in said hollow shell and located adjacent to said first end; and
c) a backing member secured to said first end of said hollow shell which retains said magnet in said hollow shell.

17. The magnetic eye protection holder of claim 16 wherein said backing member has a 3-dimensional configuration which partially encloses said magnet and which cooperates with a portion of said interior surface of said hollow shell to hold said magnet stationary.

18. The magnetic eye protection holder of claim 16 wherein said backing member is formed from a thermoplastic material.

19. The magnetic eye protection holder of claim 16 wherein said backing member has an inner surface and an outer surface, and further comprising a pair of anti-skid pads secured to said outer surface, and each of said pair of anti-skid pads being located on an opposite side of said magnet.

20. The magnetic eye protection holder of claim 16 further comprising at least two magnets retained in said hollow shell.

* * * * *

UNITED STATES PATENT AND TRADEMARK OFFICE
CERTIFICATE OF CORRECTION

| | |
|---|---|
| PATENT NO. | : 10,928,657 B2 |
| APPLICATION NO. | : 16/260709 |
| DATED | : February 23, 2021 |
| INVENTOR(S) | : Schein et al. |

It is certified that error appears in the above-identified patent and that said Letters Patent is hereby corrected as shown below:

In the Specification

Column 8, Line 19, replace "Kans" with --Kansas--.

Signed and Sealed this
Third Day of May, 2022

Katherine Kelly Vidal
*Director of the United States Patent and Trademark Office*